United States Patent
Martin et al.

(10) Patent No.: US 11,811,598 B2
(45) Date of Patent: *Nov. 7, 2023

(54) SYSTEMS AND METHODS FOR MODIFYING DEVICE OPERATION BASED ON DATASETS GENERATED USING MACHINE LEARNING TECHNIQUES

(71) Applicant: Verizon Patent and Licensing Inc., Basking Ridge, NJ (US)

(72) Inventors: Anne Lourdu Grace Joseph Martin, Chennai (IN); Malaya Rout, Chennai (IN); Mohit Kumar, Rohtas (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,823

(22) Filed: Oct. 14, 2022

(65) Prior Publication Data
US 2023/0063045 A1 Mar. 2, 2023

Related U.S. Application Data

(63) Continuation of application No. 17/109,810, filed on Dec. 2, 2020, now Pat. No. 11,502,900.

(51) Int. Cl.
*H04L 41/0813* (2022.01)
*G06F 18/22* (2023.01)
*G06F 18/214* (2023.01)
*G06F 18/2321* (2023.01)
*G06F 18/2413* (2023.01)

(52) U.S. Cl.
CPC ........ *H04L 41/0813* (2013.01); *G06F 18/214* (2023.01); *G06F 18/22* (2023.01); *G06F 18/2321* (2023.01); *G06F 18/24143* (2023.01)

(58) Field of Classification Search
None
See application file for complete search history.

(56) References Cited

U.S. PATENT DOCUMENTS

| 10,045,218 B1 | 8/2018 | Stapleton et al. |
| 10,620,854 B1 | 4/2020 | James et al. |
| 11,509,674 B1 * | 11/2022 | Beauchesne ........ H04L 63/1425 |

(Continued)

*Primary Examiner* — Hamza N Algibhah
*Assistant Examiner* — Gregory P Tolchinsky

(57) ABSTRACT

A configuration system may generate synthetic datasets based on machine learning, and may provide the synthetic datasets in order to configure, train, test, and/or otherwise modify operation of network equipment and/or other devices. The configuration system may receive a sampling of data used by the particular network equipment, and may determine parameters that define values for the variables represented in the sampling. The configuration system may generate different datasets based on the parameters, and may determine an accuracy of each dataset to the sampling based on the values of each dataset conforming by different amounts to the parameters that define the values for the variables represented in the sampling by different amounts. The configuration system may modify the network equipment operation using the values from a particular dataset in response to determining that the accuracy of the particular dataset is greatest to the sampling.

20 Claims, 10 Drawing Sheets

(56) References Cited

U.S. PATENT DOCUMENTS

| | | |
|---|---|---|
| 2016/0019271 A1* | 1/2016 | Ma .................. G06F 16/955 707/756 |
| 2020/0304364 A1 | 9/2020 | Tapia et al. |
| 2021/0097343 A1 | 4/2021 | Goodsitt et al. |
| 2022/0053010 A1 | 2/2022 | Elyashiv et al. |
| 2022/0076066 A1 | 3/2022 | Forgeat et al. |

* cited by examiner

| Id | Variable name | Data type | Min./Max./ Avg. values | Standard deviation | # of records | Class distribution | Sequence | Relationship | Missing values | Max./Min. outliers | Target variable |
|---|---|---|---|---|---|---|---|---|---|---|---|
| # | abc | ... | ... | ... | ... | ... | Yes/no | xyz | ... | ... | Yes/no |

301

305

303

+ Add new
307

309

NAME OF VARIABLE:
DATA TYPE:
MINIMUM:
MAXIMUM:
AVERAGE:
STD DEVIATION:
NUMBER OF RECORDS:
CLASS DISTRIBUTION: A:20 B:30 C:40 D:10
SEQUENCE: No
RELATIONSHIP: No
MISSING VALUES: 0
MINIMUM OUTLIERS: 0
MAXIMUM OUTLIERS: 0
TARGET VARIABLE: No

Submit

FIG. 3

SYSTEMS AND METHODS FOR MODIFYING DEVICE OPERATION BASED ON DATASETS GENERATED USING MACHINE LEARNING TECHNIQUES

CROSS-REFERENCE TO RELATED APPLICATION

This application is a Continuation of U.S. patent application Ser. No. 17/109,810, filed on Dec. 2, 2020, titled "SYSTEMS AND METHODS FOR MODIFYING DEVICE OPERATION BASED ON DATASETS GENERATED USING MACHINE LEARNING TECHNIQUES," the contents of which are herein incorporated by reference in their entirety.

BACKGROUND

Data may be used to configure a system, determine system performance, and/or train the system to perform in a certain manner. However, the availability of relevant data for these and other purposes may be limited for a variety of reasons. For instance, data that is generated by customers and/or users using the system in a production environment may not be available for use in a development, test, and/or other environment because of privacy, contractual, regulatory, and/or other limitations.

BRIEF DESCRIPTION OF THE DRAWINGS

FIG. 3 illustrates an example user interface for defining a configuration file in accordance with some embodiments presented herein;

DETAILED DESCRIPTION OF THE PREFERRED EMBODIMENTS

Figure 1:
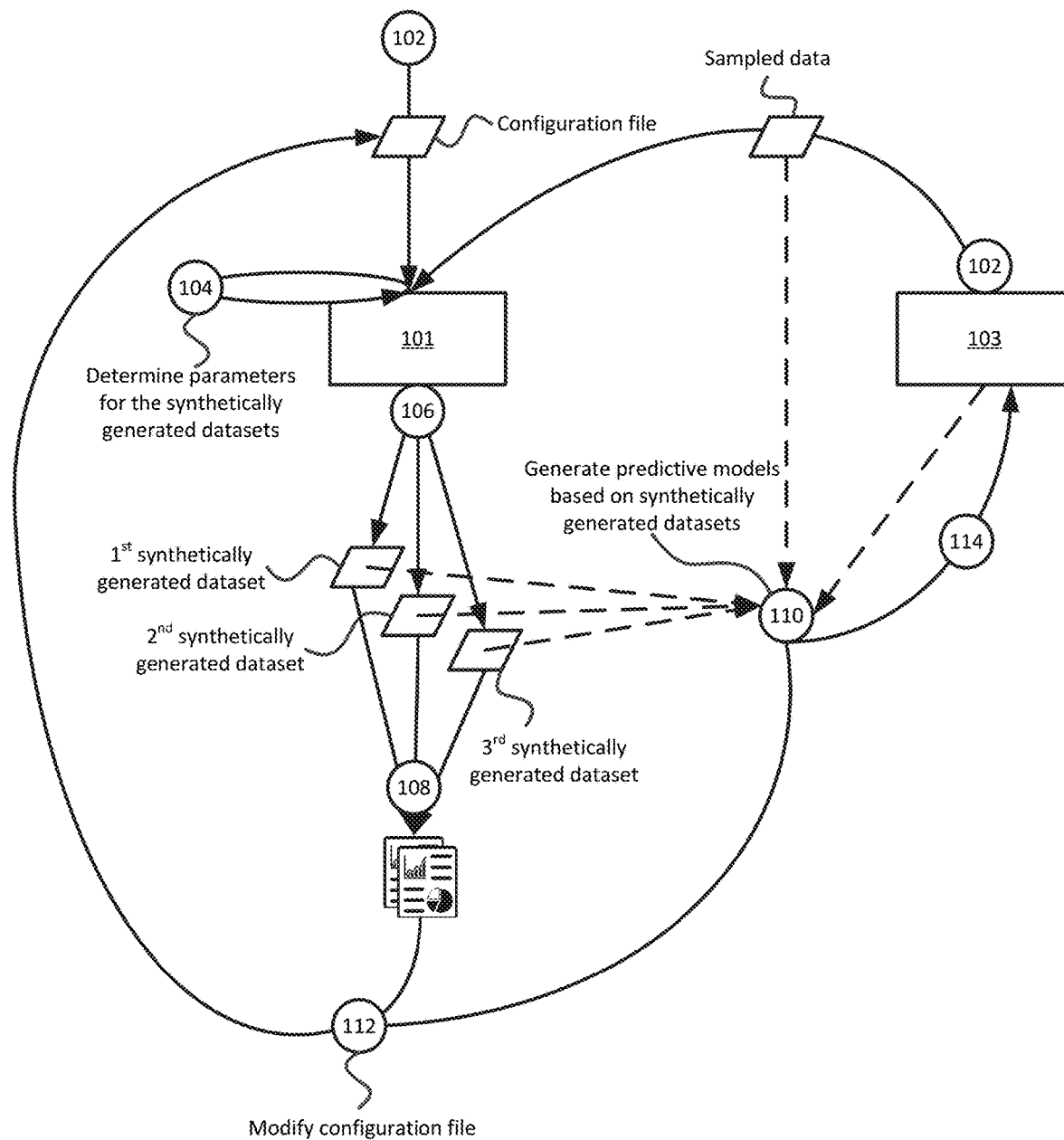
FIG. 1 illustrates an example of modifying device operation using synthetically generated datasets in accordance with some embodiments presented herein.

The following detailed description refers to the accompanying drawings. The same reference numbers in different drawings may identify the same or similar elements.

Systems and methods, described herein, may modify device operation based on datasets that are synthetically generated using artificial intelligence/machine learning ("AI/ML") techniques or other suitable techniques. The systems and methods of some embodiments may include a configuration system that generates voluminous datasets that synthetically mirror properties of actual data without directly incorporating and/or replicating the actual data that may exist in limited quantities and/or may be subject to privacy, contractual, regulatory, and/or other limitations that restrict usage of the actual data. Accordingly, the synthetic datasets may be generated in any desired quantity with properties that conform to the actual data such that the synthetic datasets may be used without restriction to configure, train, determine performance of, and/or otherwise modify or monitor operation of a configurable system.

In some embodiments, such configurable system may include elements of one or more Radio Access Networks ("RANs") associated with a wireless network, such as a Long-Term Evolution ("LTE") RAN, a Fourth Generation ("4G") RAN, a Fifth Generation ("5G") RAN, or some other type of RAN. In some embodiments, such configurable system may include elements, such as one or more Virtualized Network Functions ("VNFs"), of a core associated with a wireless network (e.g., an Evolved Packet Core ("EPC"), a 5G Core ("5GC")). In some embodiments, such configurable system may include some other type of system with provisionable or configurable parameters.

The configuration system of some embodiments may generate the synthetic datasets based on one or more of a configuration file and/or a sampling of actual data based on which the synthetic datasets are generated (referred to herein as "actual data" for the sake of brevity). In some embodiments, each synthetic dataset may include data with a non-random variation of values that conform to parameters of the configuration file and/or properties extracted from the sampling of the actual data.

The configuration system of some embodiments may produce reports with univariate, bivariate, and/or multivariate analysis of the synthetic dataset and/or with dynamically generated content based on which features, attributes, properties, etc. of the synthetic dataset may be identified or indicated. For instance, the reports may provide visualizations and/or other content that directly present the synthetic dataset properties in a summarized and/or comparative format.

In some embodiments, the configuration system may use AI/ML techniques or other suitable techniques to determine accuracy and/or performance of the different generated synthetic datasets relative to the properties of the actual data, and may select the most accurate and/or performant synthetic dataset for use in configuring, determining performance, training, and/or other tuning of a configurable system. For instance, the configuration system may input, configure, and/or otherwise apply the selected synthetic dataset to the configurable system in order to modify state, configuration parameters, and/or operation of the configurable system. In some embodiments, the configuration system may use AI/ML techniques or other suitable techniques to tune, modify, refine, etc. parameters of the configuration file in order to generate new datasets that better conform (e.g., based on a suitable similarity or dissimilarity analysis, such as regression, classification, clustering, or the like) to the properties of the actual data, and/or that improve upon the performance of the configurable system.

FIG. 1 illustrates an example of modifying device operation with datasets that are synthetically generated using AI/ML techniques or other suitable techniques in accordance with some embodiments presented herein. In particular, configuration system 101 may generate synthetic datasets that include the same or similar properties, features, attributes, etc. of actual data, may use AI/ML techniques or other suitable techniques to model the accuracy and/or performance of each synthetic dataset, and may modify operation configurable system 103 based on a synthetic dataset that is selected as a result of the accuracy and/or performance modeling.

As shown in FIG. 1, configuration system 101 may receive (at 102) one or more of a configuration file and/or a sampling of actual data. In some embodiments, the configuration file may include "training" data, which may include an initial set of values based on which synthetic datasets may be generated or modeled. In some embodiments, the training data may be based on the simulated execution of configurable system 103.

In some embodiments, the sampling of the actual data may include some or all of the data that is collected and/or used in a production environment by configurable system 103. In some embodiments, the actual data may include various types of operational data associated with configurable system 103. For instance, the operational data may include one or more of configuration data that controls operation of configurable system 103, performance data for tracking operational behavior and/or performance of configurable system 103 (e.g., Key Performance Indicators ("KPIs"), performance metrics, or the like), user data for training and/or triggering operation of configurable system 103, feedback data based on which relationships between attributes or features of the actual data may be determined, and/or other data that may affect output, responsiveness, performance, and/or other operation of configurable system 103. The actual data may be restricted from use in a development and/or other environment where enhancements, improvements, and/or other changes to configurable system 103 are developed and/or tested. The restrictions on the usage of the actual data may be due to privacy, contractual, regulatory, and/or other limitations.

Configuration system 101 may determine (at 104) parameters for the generation of the synthetic dataset from the configuration file and/or the sampled actual data. In some embodiments, the configuration file may define the parameters, and the configuration file parameters may represent the desired properties of the actual data that are to mirrored in the generated synthetic dataset. In some embodiments, configuration system 101 may determine (at 104) the parameters via a regression, classification, and/or other evaluation of the sampled actual data. The parameters may specify maximum, minimum, mean, average, etc. values for different variables, a distribution of values across one or more variables, relationships between values of different variables, sequencing of values, outliers, and/or other characteristics for representing the properties of the actual data without incorporating and/or replicating the values from the actual data.

Configuration system 101 may generate (at 106) multiple non-random synthetic datasets according to the determined (at 104) parameters. Each synthetically generated dataset may mirror properties of the sampled actual data by varying values for the actual data variables, and/or by creating new instances for each variable such that each synthetically generated dataset includes more data than provided in the sampled actual data. In other words, the records or entries of each synthetically generated dataset may have different individual names, values, relationships, and/or other characteristics than the sampled actual data. However, the overall properties, including the relationships between different variables, relationships between different data, distribution of values, average of the values, percentage of outliers, and/or standard deviation, may mirror the overall properties of the sampled actual data and/or the properties defined in the configuration file. Moreover, each synthetic dataset may be significantly larger in size and more voluminous in terms of entries or records than the sampled actual data. For instance, each synthetic dataset may include N times more data entries or records than the sampled actual data.

Configuration system 101 may generate (at 108) one or more reports for each or all the synthetically generated datasets. Dynamically generating (at 108) the reports may include providing graphical representations for visualizing the data of each dataset. In some embodiments, each graphical representation may provide a summarized or singular presentation for the values, distribution, and/or other properties of the data in the dataset. Dynamically generating (at 108) the reports may also include analyzing the data in each dataset in order to identify differentiation or uniqueness within each dataset, and creating dynamic content to present the identified differentiation or uniqueness. For instance, two synthetic datasets may have the same overall distribution. However, the first synthetic dataset may have one variable or category of data with a median that varies a threshold amount from other variables or categories of data, and the second synthetic dataset may have a non-linear relationship in the values of two variables, whereas other synthetic datasets may have a linear relationship in the values of the same two variables. Such insight may be difficult to glean directly from hundreds of values, but may be directly presented to the user in the generated (at 108) reports.

Configuration system 101 may perform (at 110) a machine learning and/or artificial intelligence evaluation of the synthetically generated datasets. The evaluation may include generating one or more predictive models by comparing the data from each dataset to the sampled actual data using various regression and/or classification techniques, and/or by comparing the properties of each dataset to the expected properties specified in the configuration file to determine a measure of similarity, dissimilarity, relatedness, etc., and/or other suitable techniques. From the comparison, configuration system 101 may model the accuracy and/or performance of each dataset relative to the sampled actual data, may rank the datasets on the basis of accuracy and/or performance, and/or may predict performance of configurable system 103 when configured, trained, and/or otherwise modified by each dataset based on a machine-learned mapping of the dataset properties to the operational behavior of configurable system 103.

In some embodiments, the evaluation may include using the synthetically generated datasets to train a machine learning model, and/or determining changes to the predictions, behavior, and/or other output produced by that machine learning model. For instance, the evaluation may include comparing predictions and/or other output that may be produced from training the machine learning model with actual data to predictions and/or other output that may be produced from training the machine learning model with the synthetically generated datasets.

Configuration system 101 may modify (at 112) the configuration file based on the insights, visualizations, and/or other data from the one or more reports and/or the predictive modeling of the datasets. In some embodiments, configuration system 101 may compare values from the generated dynamic content in the reports against one or more thresholds, and/or may identify trends, patterns, and/or other relationships in the data that may be indicative of anomalous behavior, performance, and/or operation. Accordingly, if the values from the generated dynamic content satisfy and/or exceed the one or more thresholds or if the reports reveal specific trends, patterns, and/or relationships, configuration system 101 may modify one or more aspects of the configuration file. For instance, configuration system 101 may determine that inputting a device with a linear distribution of values from a first dataset results in device performance that is within a desired performance envelope or threshold, whereas a non-linear distribution of values from a second dataset results in device performance that is not within the desired performance envelope or threshold. Accordingly, configuration system 101 may modify (at 112) the configuration file to correct for anomalous performance exhibited when the device is input with the non-linear distribution of values.

In some embodiments, the modifications (at 112) to the configuration file may be defined by a user after consideration of the reports. In some embodiments, the modifications (at 112) may be automatically performed by configuration system 101 in response to performing the predictive modeling. For instance, configuration system 101 may predict that the datasets provide a lesser than expected performance improvement for configurable system 103 because of a particular configuration file parameter that is used to generate values for one or more variables in the generated datasets. Accordingly, configuration system 101 may modify the particular configuration file parameter, may generate different datasets in response to modifications of the configuration file, and may perform (at 110) the machine learning and/or artificial intelligence evaluation of the newly generated datasets to predict whether the expected performance improvement may be realized via one or more of the newly generated datasets.

In response to determining that a particular synthetic dataset satisfies an accuracy threshold and/or performance threshold, configuration system 101 may provide (at 114) the particular synthetic dataset to configurable system 103. Providing (at 114) the particular synthetic dataset may include reconfiguring, training, and/or otherwise modifying operation of configurable system 103 using the operational data of the particular synthetic dataset.

In some embodiments, configurable system 103 may correspond to a device, VNF, and/or other network equipment at a RAN and/or core network of a wireless network. In some such embodiments, the synthetic datasets generated, tuned, and/or provided by configuration system 101 may configure, train, and/or modify network equipment functionality, network resource allocation and/or usage, performance (e.g., throughput, latency, and/or actions executed by the network equipment in response to different input), and/or other network equipment operations.

Figure 2:
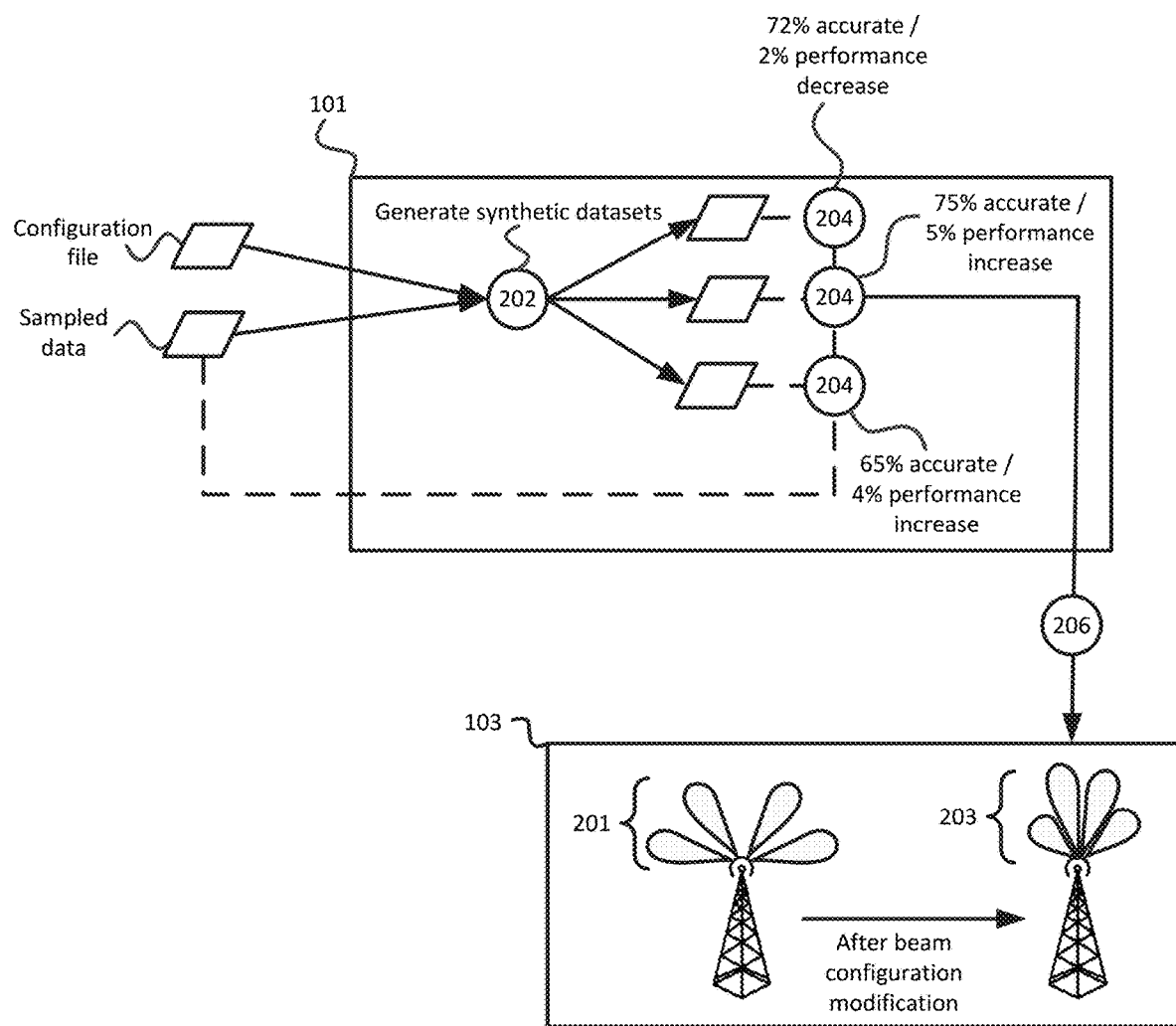
FIG. 2 illustrates an example of using a synthetically generated dataset to modify operation of a configurable system in accordance with some embodiments presented herein.

FIG. 2 illustrates an example of using a synthetically generated dataset to modify operation of a configurable system 103 in accordance with some embodiments presented herein. As shown in FIG. 2, configurable system 103 may be, may include, and/or may be implemented by a base station of a wireless network, such as a Next Generation Node B ("gNB"), an evolved Node Bs ("eNB"), and/or another type of base station.

Configuration system 101 may generate (at 202) different datasets based on a configuration file and/or sampled data from configurable system 103. The sampled data and/or the generated datasets may include data for tracking and/or managing RAN metrics and/or configuration information for the base station represented by configurable system 103.

More specifically, the sampled data and/or the generated datasets may include usage, resource, subscriber, location, performance, and/or other data associated with configurable system 103. For instance, usage data may include metrics about Radio Frequency ("RF") resource utilization and/or other utilization of other resources associated with the base station by different user equipment ("UEs"). Performance data may include throughput, latency, jitter, indications of network slices used by the UEs (e.g., where a "slice" refers to an instance of a network in which multiple instances are implemented or available), and Quality of Service ("QoS") metrics resulting from different resource allocations to different UEs. Resource data may include allocations of different Radio Access Technologies ("RATs") and/or frequency bands to different UEs, and/or configurations related to the directionality, beam width, beam power, and/or other resource of configurable system 103. More generally, the datasets may include operational data by which configurable system 103 configures resources, different RAN state (e.g., different numbers of connected UEs, different UE positioning, different demand from the connected UEs, different RATs supported by the UEs, etc.) that invoke different resource allocations from configuration system 103, and/or network performance resulting from different resource allocations and RAN state. In other words, the datasets may include configuration data that allocate different resources in response to different RAN state, and/or may include data that tracks demand at configurable system 103.

Configuration system 101 may model (at 204) the accuracy of each generated dataset to the sampled actual data, and/or may predict (at 204) performance associated with each generated dataset based on machine-learned mapping between performance and different data. Configuration system 101 may select a particular synthetically generated dataset to provide (at 206) to configurable system 103 based on the modeled accuracy and/or predicted performance.

In some embodiments, configuration system 101 may provide (at 206) the particular synthetically generated dataset in order to test and/or determine resource allocation behavior, operation of new functionality, performance, and/or other operation of configurable system 103. For instance, developers may add new functionality or may modify a configuration of configurable system 103, but may be prevented from using data that is collected from customer UEs to test the functionality and/or configuration modification. In some such embodiments, providing (at 206) the particular synthetically generated dataset may include validating operation and/or performance of configurable system 103 when changing from first beam configuration 201 to modified second beam configuration 203 under different accurately simulated scenarios represented by the data of the particular synthetically generated dataset.

In some embodiments, configuration system 101 may provide (at 206) the particular synthetically generated dataset in order to directly modify functionality and/or operation of configurable system 103. As shown in FIG. 2, configuration system 101 may modify directionality, beam width, antenna power, and/or other aspects of first beam configuration 201 of configurable system 103 using the operational data from the particular synthetically generated dataset, resulting in configurable system 103 operating with a modified second beam configuration 203. For example, modified second beam configuration 203 may provide additional RF resources such that the coverage area associated with configurable system 103 is more focused to the locations where usage is higher, and/or may modify the parameters that control the amount of RF spectrum that configurable system 103 allocates to connected UEs in response to different RAN state. As another example, configuration system 101 may predict that second beam configuration 203 allocated according to the particular synthetically generated data may provide a more even distribution of resources and/or performance relative to first beam configuration 201 based on simulated or actual load experience by configurable system 103.

In some embodiments, the configuration file that specifies the parameters for generating the synthetic datasets may be manually defined by a user or may be automatically defined by configuration system 101. Configuration system 101 may provide an interface with one or more selectable elements for selecting between the manual definition and the automatic definition of the configuration file. The manual definition of the configuration file may include a user uploading a user-defined configuration file, and/or using the interface to add, remove, and edit parameters of the user-defined configuration.

FIG. 3 illustrates example user interface 301 for defining a configuration file in accordance with some embodiments presented herein. As shown in FIG. 3, user interface 301 may include first set of columns 303 for different variables of the configuration file, and second set of columns 305 that specify the parameters for generating values for each variable identified in first set of columns 303.

For instance, second set of columns 305 may include parameters for setting the data type, minimum value, maximum value, average value, standard deviation, number of records, sequencing, relationship, and/or other conditions for generating one or more variable values independently or based on previously generated values for other variables in the same dataset. Additionally, second set of columns 305 may include parameters for specifying missing values not to use, outlier values, and/or whether the defined variable is a target variable from which the accuracy of the dataset may be determined. Second set of columns 305 may include more or less parameters depending on the configuration file being defined and/or the dataset being generated.

A variable or row corresponding to the variable definition from user interface 301 may be selected in order to modify one or more of the defined parameters for that variable. Additionally, user interface 301 may include selectable element 307 for adding new variables to the configuration file.

In response to selection of a defined variable or selectable element 307, user interface 301 may provide definition interface 309. Definition interface 309 may include interactive elements for defining the parameters of a selected and/or new variable.

Figure 4:
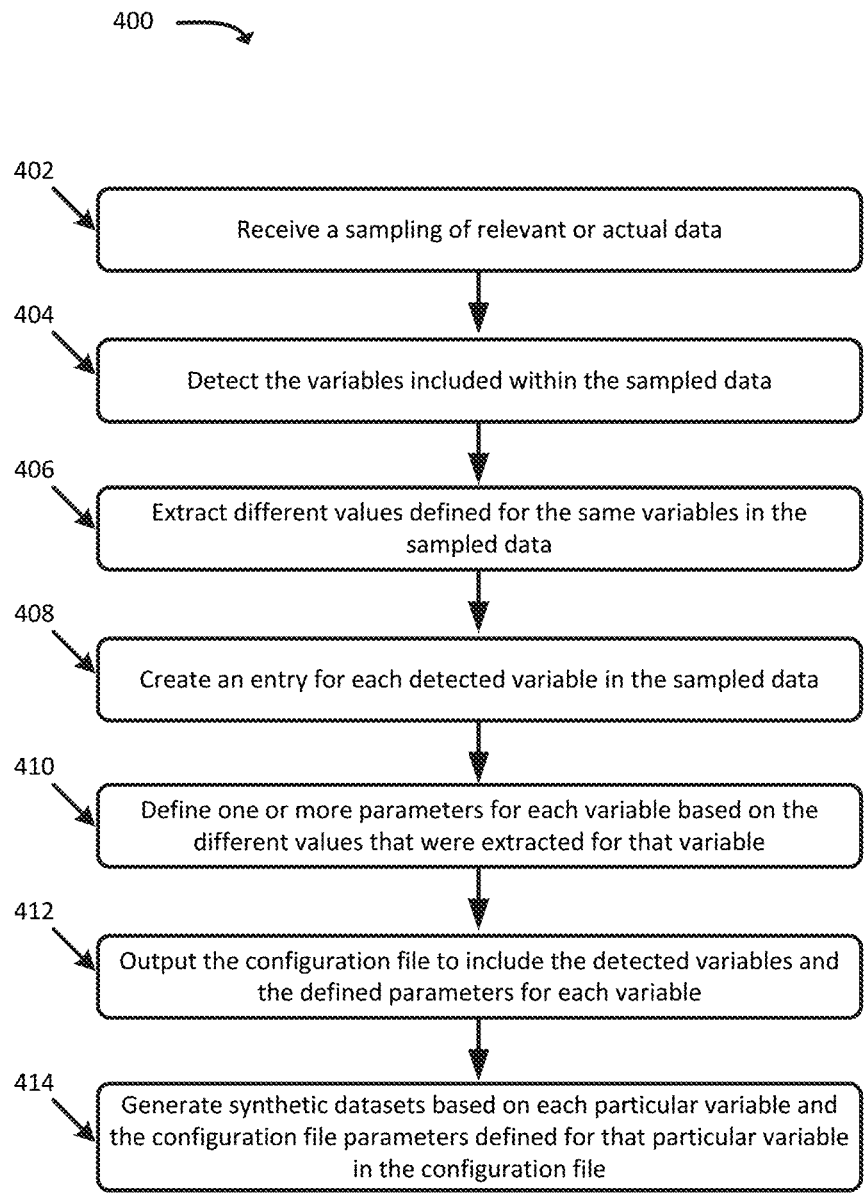
FIG. 4 presents a process for the automatic generation of a configuration file in accordance with some embodiments presented herein.

In some embodiments, configuration system 101 may automatically generate a configuration file based on a sampling of relevant or actual data. FIG. 4 presents a process 400 for the automatic generation of a configuration file in accordance with some embodiments presented herein. Process 400 may be implemented by configuration system 101.

Process 400 may include receiving (at 402) a sampling of relevant or actual data. For instance, configuration system 101 may receive (at 402) a simple random sampling of user data from production traffic that is collected and/or generated by one or more systems. The simple random sampling may be representative of the range, distribution, frequency, and/or other properties of values present within the production traffic. In some embodiments, the sampled data may be anonymized prior to uploading to configuration system 101. In some other embodiments, the sampled data may represent such a small fractional amount of the overall data that the sampled data is legally or contractually permitted for use in automatically defining the configuration file and/or the generation of the synthetic datasets.

Process 400 may include detecting (at 404) the variables included within the sampled data. A variable may include a repeating data field with a static or changing value in the sampled data. Configuration system 101 may assign a unique identifier and/or name to each detected variable.

Process 400 may include extracting (at 406) different values defined for the same variables in the sampled data. For instance, the sampled data may include different allocations of RF spectrum and/or different RATs used by different UEs that access wireless service through the same RAN, and may further include one or more performance metrics associated with each UE.

Process 400 may automatically generate the configuration file for the sampled data by creating (at 408) an entry for each detected variable in the sampled data, and by defining (at 410) one or more parameters for each variable based on the different values that were extracted for that variable. For instance, configuration system 101 may determine that the UEs received different 10-megahertz ("MHz") blocks of RF spectrum, and may determine the maximum, minimum, and/or average blocks of allocated spectrum as well as the distribution of spectrum across the UEs. Configuration system 101 may define parameters for an RF spectrum allocation variable in the configuration file to account for the determined ranges, distributions, and/or other variations.

Process 400 may include outputting (at 412) the configuration file to include the detected variables and the defined parameters for setting values for each of the variables. In some embodiments, configuration system 101 may output (at 412) the configuration file for presentation on user interface 301 so that the variables and/or parameters may be manually inspected and/or edited.

Process 400 may include generating (at 414) different synthetic datasets based on the variables and variable parameters of the configuration file. Specifically, each synthetic dataset may include a plurality of entries or records that provide each particular variable of the variables specified in the configuration file with varying values that satisfy the configuration file parameters defined for that particular variable in the configuration file. In this manner, each synthetic dataset may provide a larger enumeration of the sampled data with different values that conform to properties of the sampled data.

Each synthetic dataset may be stored as a separate file, and may provide a table-based or array-based presentation of the data. The overall relationship between the data in a generated synthetic dataset may be difficult to decipher from such presentations of the data, especially when the generated synthetic data includes hundreds, thousands, or millions of entries.

Accordingly, configuration system 101 may produce a report to provide visualizations for data from each generated synthetic dataset. Each visualization may provide a singular summarized presentation of the data so that patterns, trends, distributions, and/or relationships within the data may be directly presented.

In some embodiments, configuration system 101 may perform a univariate, bivariate, multivariate, and/or other analysis of the data in the synthetic dataset, and may produce a different visualization for each analysis. A univariate analysis may include configuration system 101 selecting a single variable in the synthetic dataset, and generating a visualization based on the different values that are generated for that single variable in the synthetic dataset. A bivariate or multivariate analysis may include configuration system 101 selecting two or more variables in the synthetic dataset, and generating a visualization that illustrates the relationship between the different values that are generated for the two or more variables in the synthetic dataset. For instance, configuration system 101 may produce a pie chart, histogram, box plot, and/or other visualizations for the data based on the univariate analysis, and may produce a grouped box plot, scatter plot, heat map, cross tabulations, and/or other visualizations for the data based on the bivariate analysis.

In some embodiments, configuration system 101 may generate dynamic content to include in the report with or in place of the visualizations. The dynamic content may correspond to insights that configuration system 101 may derive from the synthetic dataset and/or relationships between variables in the dataset represented in the visualizations produced for the synthetic dataset. In particular, the dynamic content may include dynamically generated text, graphical representations, and/or other data for directly identifying variances, anomalies, trends, patterns, and/or other relationships.

Figure 5:
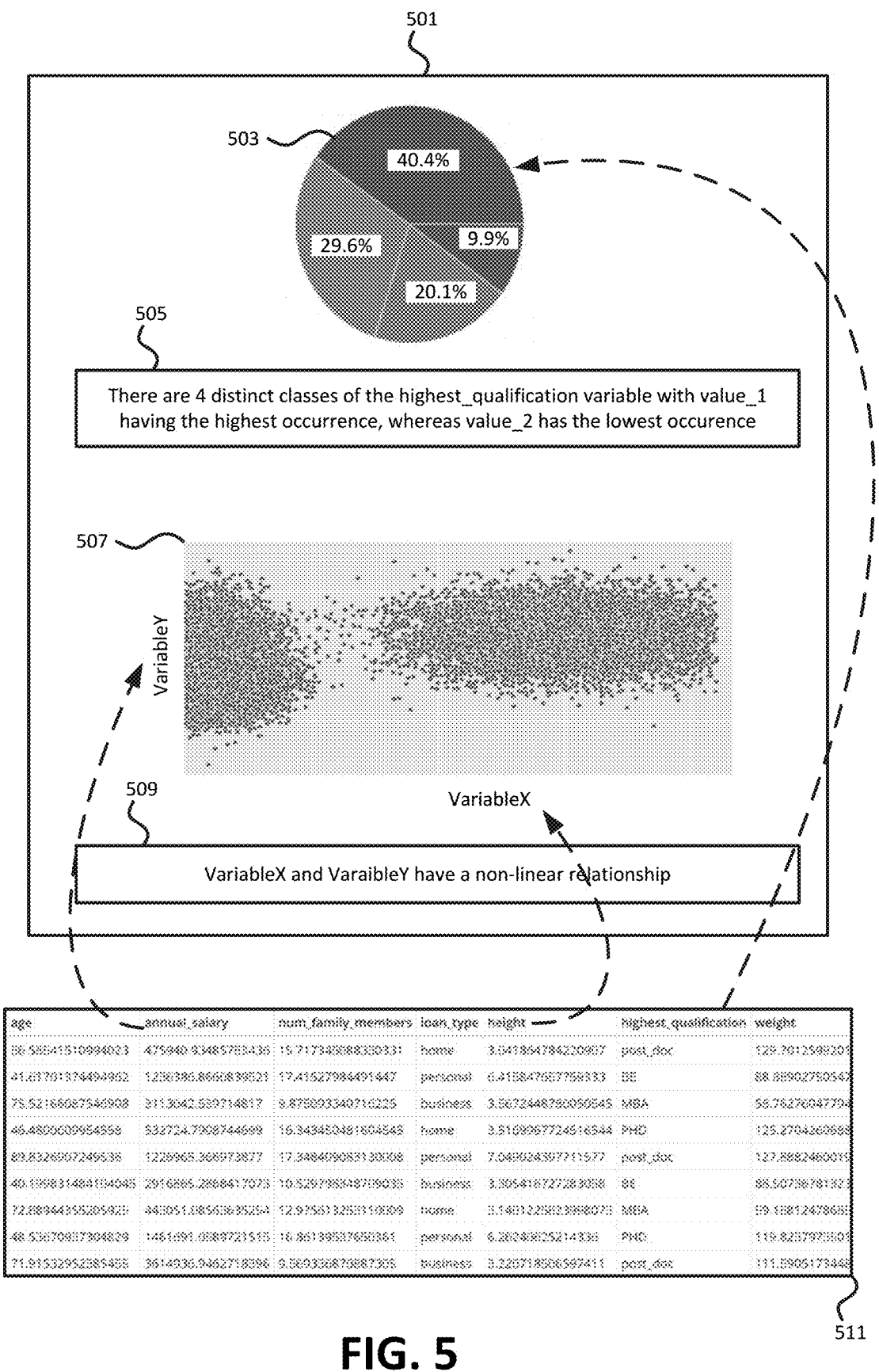
FIG. 5 illustrates an example report with different visualizations and dynamic content for each visualization in accordance with some embodiments presented herein.

In some embodiments, the insights may provide statistical analysis or comparison for the data presented in a visualization. FIG. 5 illustrates example report 501 with different visualizations and dynamic content for each visualization in accordance with some embodiments presented herein.

Example report 501 may include first visualization 503 that provides a single presentation for a univariant analysis for the values of a particular variable from particular dataset 511. First dynamic content 505 may include content that is generated by configuration system 101 based on the univariant analysis of the particular variable. First dynamic content 505 may provide one or more direct insights as to the univariant analysis and/or what is illustrated by first visualization 503.

Example report 501 may also include second visualization 507 that provides a single presentation for a bivariant analysis for the values of two related variables from particular dataset 511. Second dynamic content 509, provided with second visualization 507, may provide one or more direct insights as to the bivariant analysis and/or what is illustrated by second visualization 507.

In some embodiments, users may manually adjust the configuration file based on the insights gained from the reports generated by configuration system 101. For example, a user may determine that the synthetically generated data omits or fails to satisfy certain properties based on the visualizations and dynamically generated content in the reports. As another example, the user may determine that the provided distribution for the synthetically generated data does not match accurately enough to desired distribution, that the relationship between certain data creates an undesired property, and/or that the outlier values distort the overall dataset beyond a threshold amount. The user may manually adjust one or more parameters and/or criteria of the configuration file to correct the abnormalities, and may request that configuration system 101 generates alternate datasets based on the adjusted configuration file.

In some embodiments, configuration system 101 may use AI/ML techniques or other suitable techniques to model the accuracy of each generated synthetic dataset relative to sampled data. Configuration system 101 may use the accuracy models to select a particular synthetic dataset with values and/or properties that most closely align with those of a sampled dataset, and/or that match by an accuracy threshold and/or amount of accuracy to the values and/or properties of the sample dataset. Configuration system 101 may provide the selected synthetic dataset to a configurable system in order to test, train, configure, and/or otherwise tune operation and/or performance of the configurable system using the operational data from the selected synthetic dataset.

In some embodiments, configuration system 101 may use AI/ML techniques or other suitable techniques to model and/or predict performance of the each generated synthetic dataset. The performance modeling may include determining an impact that each value from sampled data has on a configurable system, and mapping the impact to the value of each variable in a synthetic dataset. Configuration system 101 may determine if the modeled and/or predicted performance of a particular synthetic dataset satisfies a performance threshold and/or improves upon the performance of the configurable system, and may provide the particular synthetic dataset to the configurable system in order to tune operation and/or performance of the configurable system using the data from the particular synthetic dataset.

Figure 6:
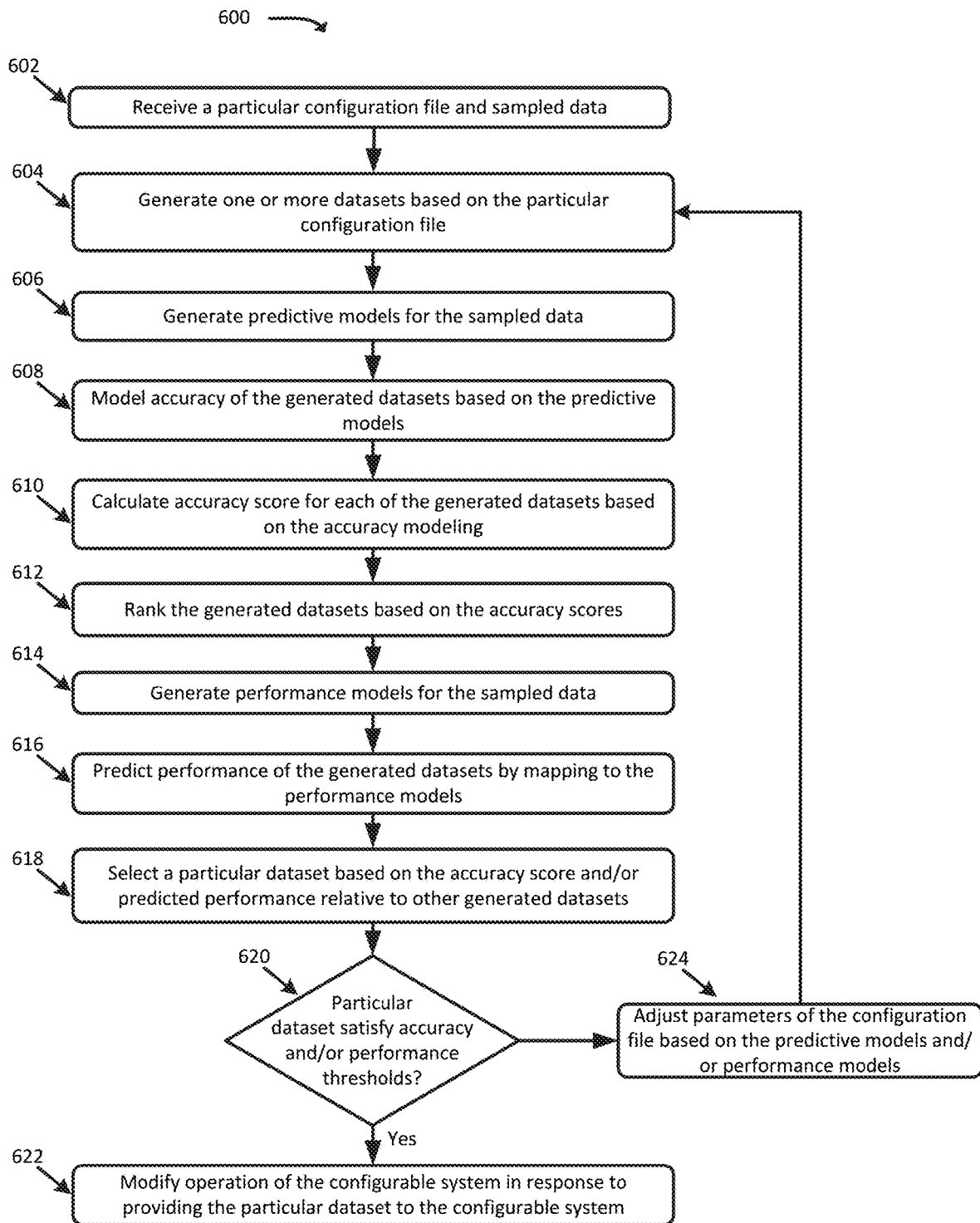
FIG. 6 presents a process for the selective tuning of the synthetic datasets in accordance with some embodiments presented herein.

In response to determining that the synthetically generated datasets lack sufficient accuracy with the sampled dataset, do not satisfy the accuracy threshold, and/or do not satisfy the performance threshold, configuration system 101 may automatically modify the configuration file to generate alternate datasets that more accurately conform to the values and/or properties of the sampled dataset, and/or that improve the performance of the configurable system. FIG. 6 presents a process 600 for the selective tuning of the synthetic datasets in accordance with some embodiments presented herein. Process 600 may be implemented by configuration system 101.

Process 600 may include receiving (at 602) a particular configuration file and sampled data, and generating (at 604) one or more datasets based on the particular configuration file. Generating (at 604) the one or more datasets may include populating the value for each variable defined in the particular configuration file according to the parameters that are set in the particular configuration file for that variable. Accordingly, the same variable may have different values in different dataset that are within specified minimum and maximum values, that follow a specified distribution, that follow a specified sequencing, that include certain outliers, and/or conform to other parameters specified for the variable in the particular configuration file.

Process 600 may include generating (at 606) one or more predictive models for the sampled data. Generating (at 606) the predictive models may include analyzing the sampled data, and/or generating one or more functions to predict values for different variables of the sampled data. In particular, the predictive modeling may include selecting a variable from the sampled data, determining whether values for the selected variable are discrete and categorical or numerical and continuous. In response to selecting a variable with discrete and categorical values, configuration system 101 may compile values for the selected variable in the sampled data, and may use one or more classification algorithms to develop a classification model for the compiled values. The classification model may include a mapping function that computes a probability by which a particular discrete value is assigned to the variable in the dataset. In response to selecting a variable with numerical and continuous values, configuration system 101 may compile values for the selected variable in the sample data, and may use one or more regression algorithms to develop a regression model for the compiled values. The regression model may include a mapping function that computes a probability by which an integer or floating point value within an error threshold is assigned to the variable in the dataset. For instance, the regression model may generate a value of 3.3 for a particular variable, and the value may be an accurate prediction due to the value being within the error threshold of 0.5 of an expected value of 3.0.

Process 600 may include modeling (at 608) the accuracy of the generated datasets based on the predictive models. Modeling (at 608) the accuracy may include scoring the values for a particular variable from each synthetic dataset based on the predictive model function that was generated for the particular variable based on the compiled values for that particular variable value in the sampled data.

Process 600 may include calculating (at 610) an accuracy score for each of the generated datasets based on the accuracy modeling (at 608). The accuracy score may represent the closeness and/or correlation between the values and/or other properties of a generated dataset and the values and/or other properties of the sampled data. More specifically, the accuracy score may quantify how closely the values from the generated dataset conform to the distribution, standard deviation, sequencing, relationships, average values, outlying values, and/or other properties of the sampled data. Process 600 may include ranking (at 612) the generated datasets based on the accuracy scores.

Process 600 may include generating (at 614) performance models for the sampled data. Generating (at 614) the performance models may include correlating different performance exhibited by a configurable system when configured, trained, and/or operating with different values of the sampled data. For instance, the performance models may indicate a direct correlation between different beam configurations (e.g., directionality, beam width, beam power, and/or other resources) at a base station and packet loss, average latency, average throughput, and/or other performance metrics. Configuration system 101 may generate (at 614) the performance models by monitoring performance of a configurable system over time, matching timestamps for the monitored performance to timestamps associated with the sampled data, and/or determining changes in the sampled data and changes in performance that occurred between two timestamps.

Process 600 may include predicting (at 616) the performance of the generated datasets by mapping to the performance models. Predicting (at 616) the performance of the generated datasets may include mapping different values or sets of values from the generated datasets to different performance impacts in the performance models, and deriving an overall performance when configuring, training, and/or otherwise tuning the configurable system with the values from a particular generated dataset.

Process 600 may include selecting (at 618) a particular dataset with the highest accuracy score and/or that is predicted to provide the best performance relative to other generated datasets. Process 600 may include determining (at 620) if the accuracy score and/or performance of the particular dataset satisfy one or more thresholds. In particular, configuration system 101 may determine (at 620) if the particular dataset has sufficient accuracy with the sampled dataset, and may determine (at 620) if the particular dataset offers a performance improvement relative to current performance exhibited by a configurable system.

In response to determining (at 620—Yes) that the particular dataset satisfies the one or more accuracy and/or performance thresholds, process 600 may include modifying (at 622) operation of the configurable system in response to providing the particular dataset from configuration system 101 to the configurable system. In some embodiments, the particular dataset may include configurable parameters that directly control the configurable system operation. In some embodiments, the particular dataset may be entered into a machine learning routine from which operational parameters and/or configuration of the configurable system may be set and/or adjusted. In some embodiments, the particular dataset may be provided as input to the configurable system in order to determine if the configurable system responds correctly, provides correct output, modifies operation correctly, and/or otherwise modifies operation in accordance with changes in the particular dataset.

In response to determining (at 620—No) that the particular dataset does not satisfy the one or more accuracy and/or performance thresholds, process 600 may include adjusting (at 624) one or more parameters of the particular configuration file based on the predictive models and/or performance models. In particular, configuration system 101 may adjust parameters for generated values that deviated too far (e.g., a specified amount or percentage) from values of the sampled data, and/or may adjust parameters for generated values that resulted in a predicted performance decrease. Process 600 may include generating (at 604) new synthetic datasets based on the adjusted configuration file, and performing the various modeling to determine whether any of the new synthetic datasets satisfy the accuracy and/or performance thresholds in order to modify operation of the configurable system.

In some embodiments, configuration system 101 may use a classifier to determine the relative accuracy of the generated datasets to the sampled data. In some such embodiments, configuration system 101 may generate the synthetic datasets to include the sampled data with a plurality of synthetically generated data. The sampled data may be differentiated from the synthetically generated data with an indicator, identifier, and/or value in each dataset. The synthetic datasets with the integrated sampled data may be input to a classifier.

The classifier may programmatically attempt to identify real data (e.g., the sampled data) from the synthetic data based on the data values. For instance, the classifier may be trained based on the sampled data, and may use AI/ML techniques or other suitable techniques to determine relationships between the data values and the class of data. The classifier may scan the generated datasets to identify data and/or values that violate the class relationships. Accuracy of the generated datasets may be determined based on the number or percentage of anomalous data detected by the classifier.

Figure 7:
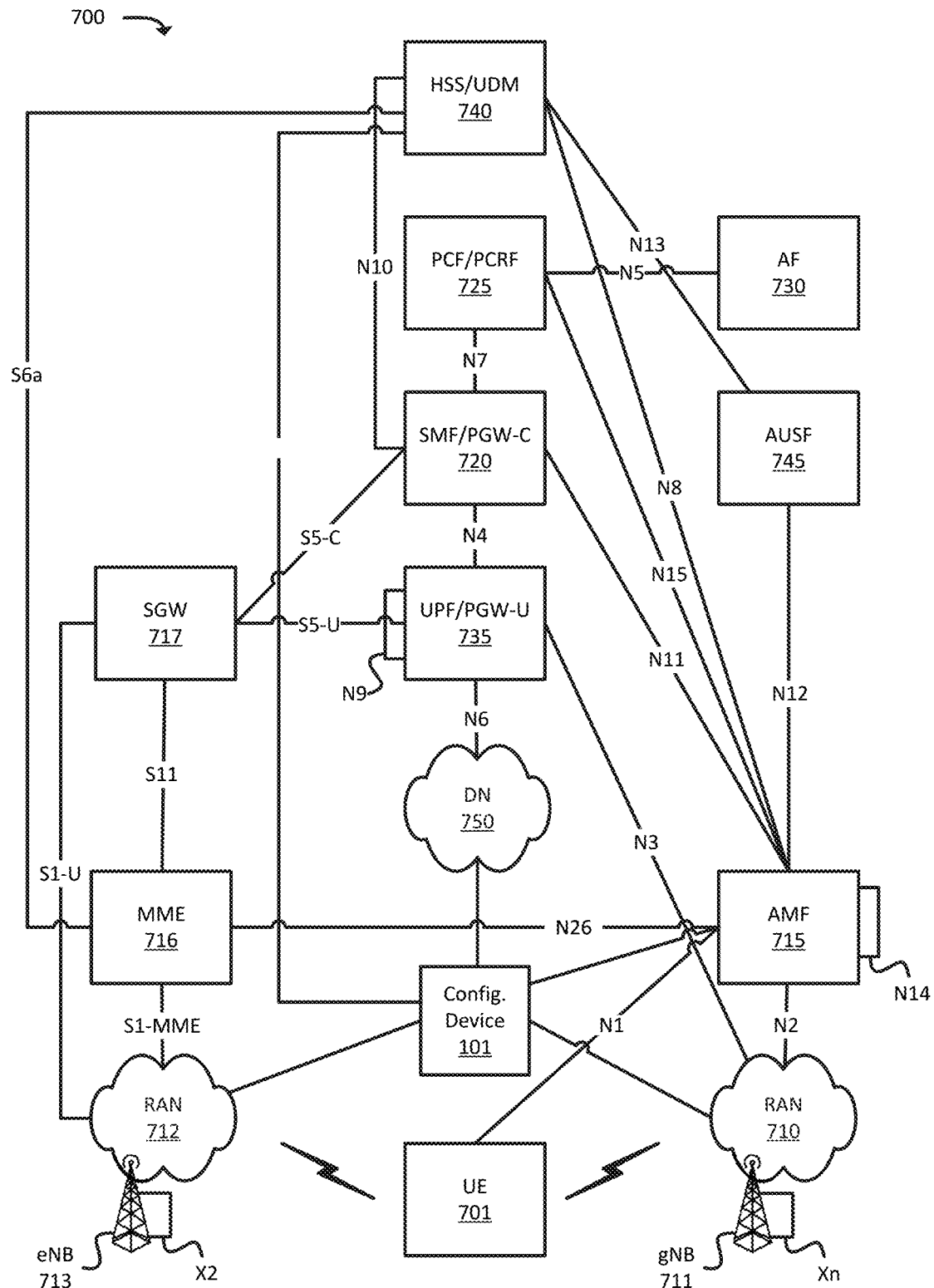
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G RAT may be used in conjunction with one or more other RATs (e.g., a LTE RAT), and/or in which elements of a 5GC network may be implemented by, may be communicatively coupled with, and/or may include elements of another type of core network (e.g., an EPC). As shown, environment 700 may include UE 701, RAN 710 (which may include one or more gNBs 711), RAN 712 (which may include one or more one or more eNBs 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, Authentication Server Function ("AUSF") 745, and configuration system 101. Environment 700 may also include one or more networks, such as Data Network ("DN") 750.

The example shown in FIG. 7 illustrates one instance of each network component or function (e.g., one instance of SMF/PGW-C 720, PCF/PCRF 725, UPF/PGW-U 735, HSS/UDM 740, and/or 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or 745, while another slice may include a second instance of SMF/PGW-C 720, PCF/PCRF 725, UPF/PGW-U 735, HSS/UDM 740, and/or 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, VNFs, etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

In some embodiments, configuration system 101 may generate synthetic datasets for configuring, testing, training, and/or otherwise modifying operation of one or more of the network equipment illustrated in FIG. 7, and/or may provide the one or more generated synthetic datasets based on the modeling in order to modify operation of one or more of the network equipment illustrated in FIG. 7. As was noted above, configuration system 101 may modify a beam configuration and/or other parameters for one or more of gNB 711 and eNB 713 using data from a particular synthetic dataset that is generated by configuration system 101 and that satisfies various accuracy, performance, and/or other thresholds.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
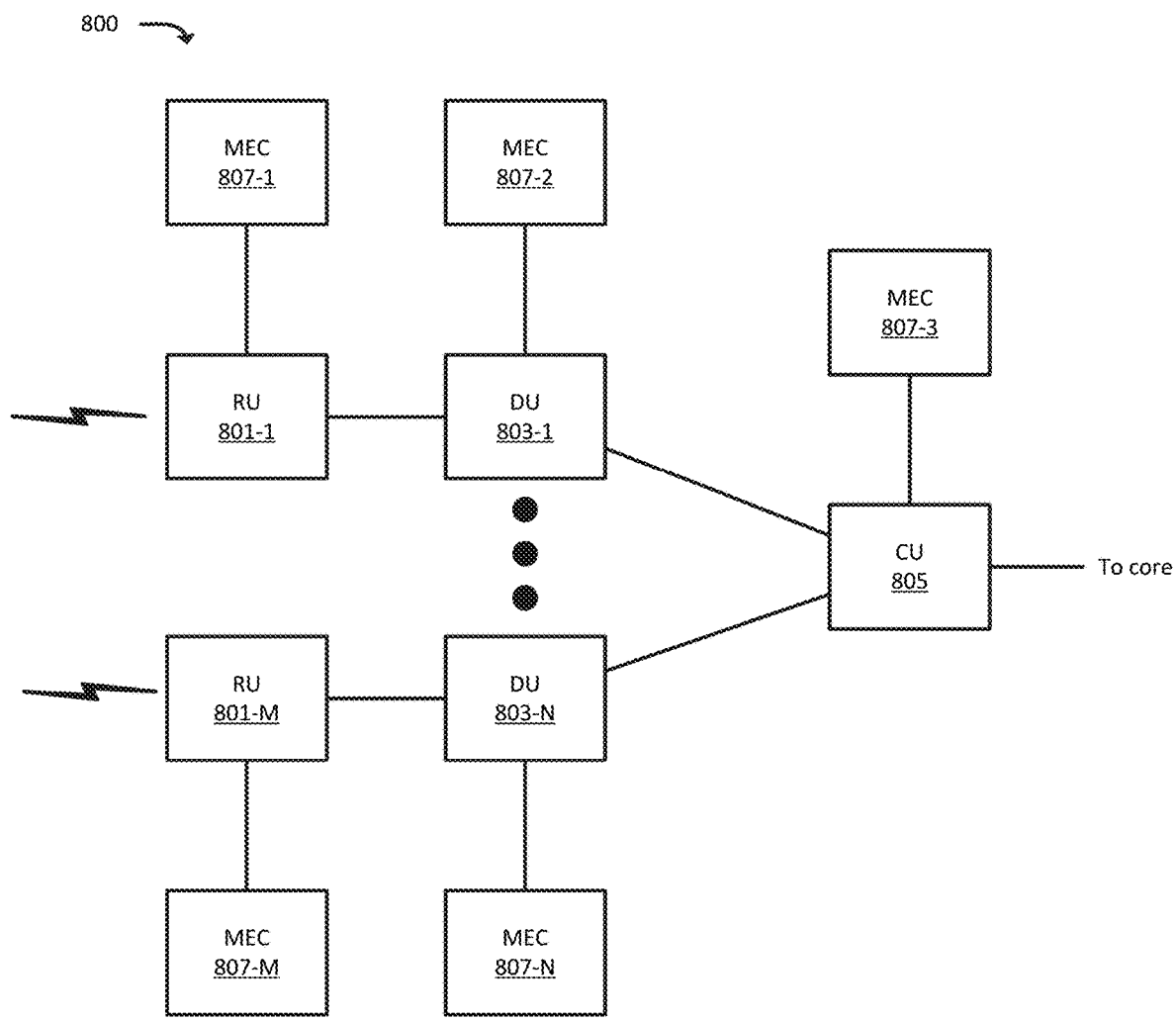
FIG. 8 illustrates an example arrangement of a Radio Access Network ("RAN"), in accordance with some embodiments.

FIG. 8 illustrates an example Distributed Unit ("DU") network 800, which may be included in and/or implemented by one or more RANs (e.g., RAN 710). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("Rus") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as ("MECs") 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network.

MEC 807 may include, and/or may implement some or all of the functionality described above with respect to configuration system 101. In some embodiments, configuration system 101 may perform the synthetic dataset generation, accuracy modeling, performance modeling, configuration, testing, training, and/or modification for MECs 807, RUs 801, DUs 803, CU 805, and/or other network equipment represented in FIG. 8.

Figure 9:
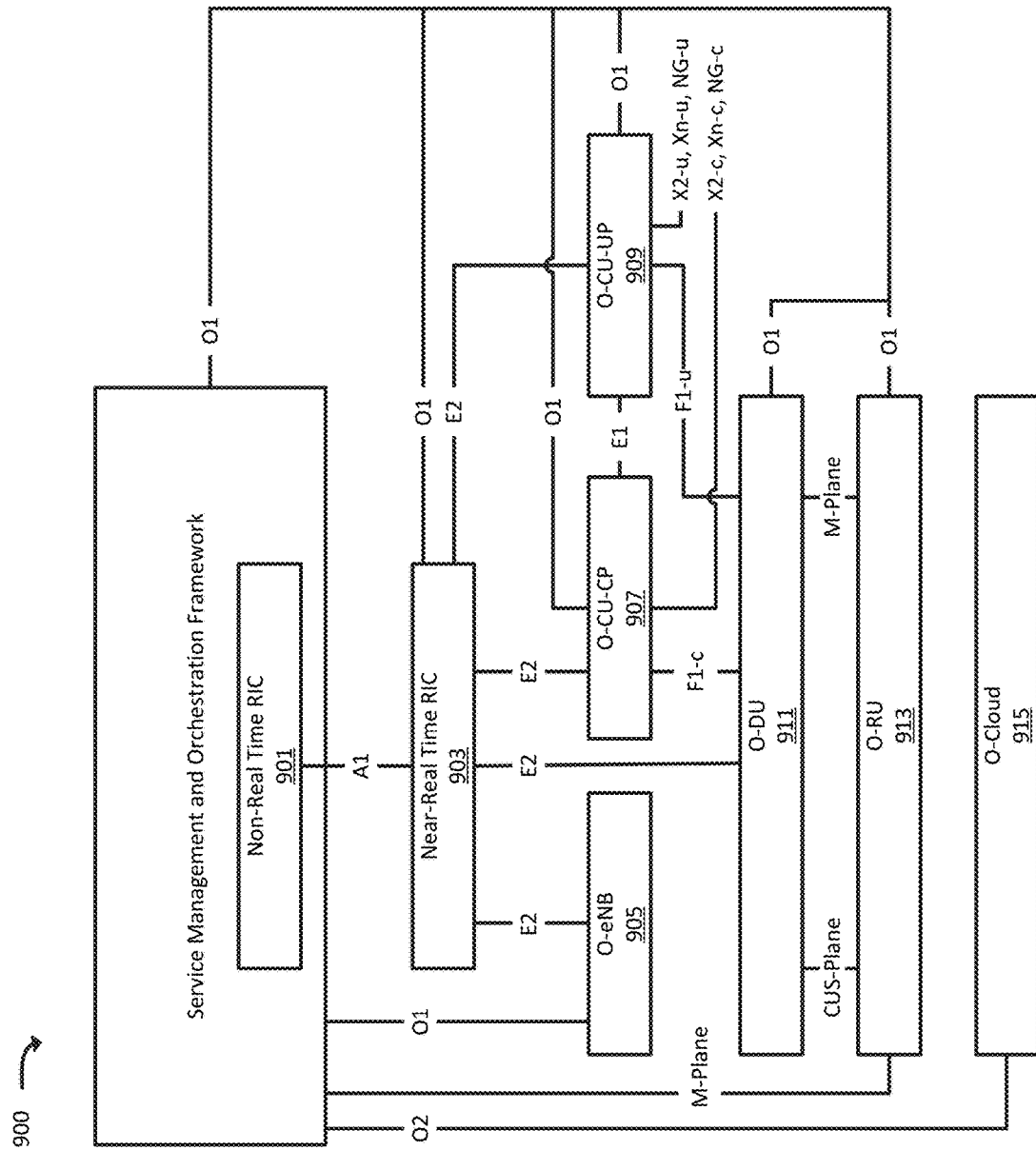
FIG. 9 illustrates an example arrangement of an Open RAN ("O-RAN") environment in which one or more embodiments, described herein, may be implemented.

FIG. 9 illustrates an example O-RAN environment 900, which may correspond to RAN 710, RAN 712, and/or DU network 800. For example, RAN 710, RAN 712, and/or DU network 800 may include one or more instances of O-RAN environment 900, and/or one or more instances of O-RAN environment 900 may implement RAN 710, RAN 712, DU network 800, and/or some portion thereof. As shown, O-RAN environment 900 may include Non-Real Time Radio Intelligent Controller ("RIC") 901, Near-Real Time RIC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components.

In some embodiments, some or all of the elements of O-RAN environment 900 may be implemented by one or more configurable or provisionable resources, such as virtual machines, cloud computing systems, physical servers, and/or other types of configurable or provisionable resources. In some embodiments, some or all of O-RAN environment 900 may be implemented by, and/or communicatively coupled to, one or more MECs 807.

Non-Real Time RIC 901 and Near-Real Time RIC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900. In some embodiments, Non-Real Time RIC 901 may generate machine learning models based on performance information associated with O-RAN environment 900 or other sources, and may provide such models to Near-Real Time RIC 903 for implementation. In some embodiments, configuration system 101 may perform the synthetic dataset generation, accuracy modeling, performance modeling, configuration, testing, training, and/or modification for O-eNB 905, O-CU-CP 907, and/or O-CU-UP 909, and/or other elements of O-RAN environment 900.

O-eNB 905 may perform functions similar to those described above with respect to eNB 713. For example, O-eNB 905 may facilitate wireless communications between UE 701 and a core network. O-CU-CP 907 may perform control plane signaling to coordinate the aggregation and/or distribution of traffic via one or more DUs 803, which may include and/or be implemented by one or more O-DUs 911, and O-CU-UP 909 may perform the aggregation and/or distribution of traffic via such DUs 803 (e.g., O-DUs 911). O-DU 911 may be communicatively coupled to one or more RUs 801, which may include and/or may be implemented by one or more O-RUs 913. In some embodiments, O-Cloud 915 may include or be implemented by one or more MECs 807, which may provide services, and may be communicatively coupled, to O-CU-CP 907, O-CU-UP 909, O-DU 911, and/or O-RU 913 (e.g., via an O1 and/or O2 interface).

Figure 10:
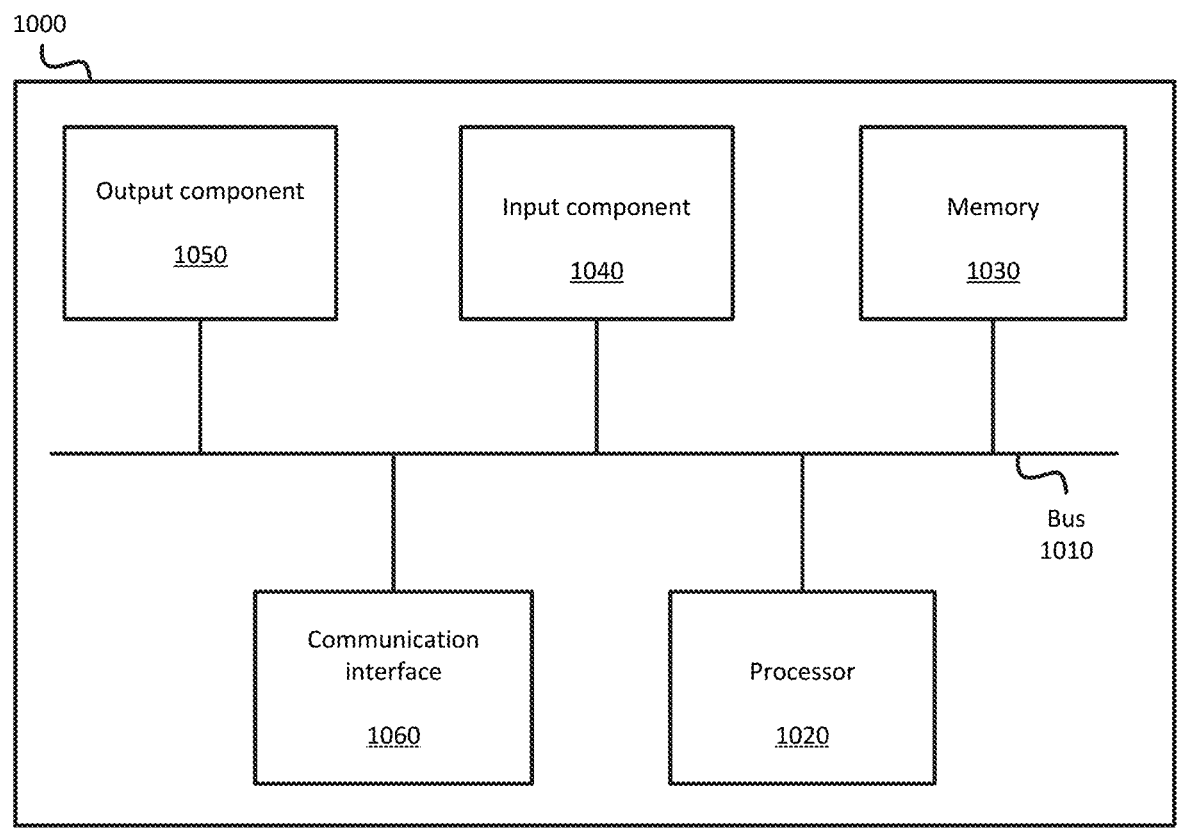
FIG. 10 illustrates example components of one or more devices, in accordance with one or more embodiments described herein.

FIG. 10 illustrates example components of device 1000. One or more of the devices described above (e.g., configuration system 101) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive monitored performance information associated with a network, wherein the monitored performance information includes a particular set of values that include at least one value for each variable of a set of variables;
   generate a plurality of sets of values based on the set of variables, wherein each generated set of values, of the plurality of sets of values, includes at least one value for each variable of the set of variables;
   determine, for each generated set of values, a respective measure of similarity between the each generated set of values and the particular set of values associated with the monitored performance information;
   identify which sets of values, of the plurality of sets of values, exceed a threshold measure of network performance;
   select a particular generated set of values based on the determined respective measures of similarity between the each generated set of values and the particular set of values associated with the monitored performance information, wherein selecting the particular generated set of values further includes selecting the particular generated set of values from the identified sets of values that exceed the threshold measure of network performance; and
   update a configuration of the network based on selected particular generated set of values.

2. The device of claim 1, wherein the one or more processors are further configured to:
   identify a particular performance model based on the monitored performance information,
   wherein identifying which sets of values exceed the threshold measure of network performance includes applying the respective sets of values, of the generated sets of values, to the identified particular performance model.

3. The device of claim 1, wherein the plurality of sets of values is a second plurality of sets of values, wherein generating the plurality of sets of values includes:
   generating a first plurality of sets of values based on a first set of parameters;
   determining that a first measure of similarity, between one or more of the first plurality of sets of values and the particular set of values associated with the monitored performance information, is below a threshold measure of similarity;
   generating a second set of parameters based on determining that the first measure of similarity is below the threshold measure of similarity;
   generating the second plurality of sets of values based on the second set of parameters; and
   determining that a second measure of similarity, between one or more of the second plurality of sets of values and the particular set of values associated with the monitored performance information, exceeds the threshold measure of similarity.

4. The device of claim 3, wherein generating the second set of parameters includes adjusting the first set of parameters to generate the second set of parameters.

5. The device of claim 1, wherein generating the plurality of sets of values based on the set of variables includes generating one or more values for an additional variable that is different from the variables included in the set of variables.

6. The device of claim 1, wherein the one or more processors are further configured to:
calculate a measure of deviation between each generated set of values and the particular set of values associated with the monitored performance information, wherein the determined measures of similarity are based on the respective calculated measures of deviation between each generated set of values and the particular set of values associated with the monitored performance information.

7. The device of claim 1, wherein selecting the particular generated set of values further includes determining that the particular generated set of values are associated with an improvement of one or more measures of network performance.

8. A non-transitory computer-readable medium, storing a plurality of processor-executable instructions to:
receive monitored performance information associated with a network, wherein the monitored performance information includes a particular set of values that include at least one value for each variable of a set of variables;
generate a plurality of sets of values based on the set of variables, wherein each generated set of values, of the plurality of sets of values, includes at least one value for each variable of the set of variables;
determine, for each generated set of values, a respective measure of similarity between the each generated set of values and the particular set of values associated with the monitored performance information;
identify which sets of values, of the plurality of sets of values, exceed a threshold measure of network performance;
select a particular generated set of values based on the determined respective measures of similarity between the each generated set of values and the particular set of values associated with the monitored performance information, wherein selecting the particular generated set of values further includes selecting the particular generated set of values from the identified sets of values that exceed the threshold measure of network performance; and
update a configuration of the network based on selected particular generated set of values.

9. The non-transitory computer-readable medium of claim 8, wherein the plurality of processor-executable instructions further include processor-executable instructions to:
identify a particular performance model based on the monitored performance information,
wherein identifying which sets of values exceed the threshold measure of network performance includes applying the respective sets of values, of the generated sets of values, to the identified particular performance model.

10. The non-transitory computer-readable medium of claim 8, wherein the plurality of sets of values is a second plurality of sets of values, wherein generating the plurality of sets of values includes:
generating a first plurality of sets of values based on a first set of parameters;
determining that a first measure of similarity, between one or more of the first plurality of sets of values and the particular set of values associated with the monitored performance information, is below a threshold measure of similarity;
generating a second set of parameters based on determining that the first measure of similarity is below the threshold measure of similarity;
generating the second plurality of sets of values based on the second set of parameters; and
determining that a second measure of similarity, between one or more of the second plurality of sets of values and the particular set of values associated with the monitored performance information, exceeds the threshold measure of similarity.

11. The non-transitory computer-readable medium of claim 10, wherein generating the second set of parameters includes adjusting the first set of parameters to generate the second set of parameters.

12. The non-transitory computer-readable medium of claim 8, wherein generating the plurality of sets of values based on the set of variables includes generating one or more values for an additional variable that is different from the variables included in the set of variables.

13. The non-transitory computer-readable medium of claim 8, wherein the plurality of processor-executable instructions further include processor-executable instructions to:
calculate a measure of deviation between each generated set of values and the particular set of values associated with the monitored performance information, wherein the determined measures of similarity are based on the respective calculated measures of deviation between each generated set of values and the particular set of values associated with the monitored performance information.

14. A method, comprising:
receiving monitored performance information associated with a network, wherein the monitored performance information includes a particular set of values that include at least one value for each variable of a set of variables;
generating a plurality of sets of values based on the set of variables, wherein each generated set of values, of the plurality of sets of values, includes at least one value for each variable of the set of variables;
determining, for each generated set of values, a respective measure of similarity between the each generated set of values and the particular set of values associated with the monitored performance information;
identifying which sets of values, of the plurality of sets of values, exceed a threshold measure of network performance;
selecting a particular generated set of values based on the determined respective measures of similarity between the each generated set of values and the particular set of values associated with the monitored performance information, wherein selecting the particular generated set of values further includes selecting the particular generated set of values from the identified sets of values that exceed the threshold measure of network performance; and
updating a configuration of the network based on selected particular generated set of values.

15. The method of claim 14, further comprising:
identifying a particular performance model based on the monitored performance information; and
applying the respective sets of values, of the generated sets of values, to the identified particular performance model in order to determine a respective measure of network performance associated with each set of values, of the generated sets of values, wherein selecting the particular generated set of values is further based on the respective measure of network performance associated with each set of values, of the generated set of values.

16. The method of claim 14, wherein the plurality of sets of values is a second plurality of sets of values, wherein generating the plurality of sets of values includes:
generating a first plurality of sets of values based on a first set of parameters;
determining that a first measure of similarity, between one or more of the first plurality of sets of values and the particular set of values associated with the monitored performance information, is below a threshold measure of similarity;
generating a second set of parameters based on determining that the first measure of similarity is below the threshold measure of similarity;
generating the second plurality of sets of values based on the second set of parameters; and
determining that a second measure of similarity, between one or more of the second plurality of sets of values and the particular set of values associated with the monitored performance information, exceeds the threshold measure of similarity.

17. The method of claim 16, wherein generating the second set of parameters includes adjusting the first set of parameters to generate the second set of parameters.

18. The method of claim 14, wherein generating the plurality of sets of values based on the set of variables includes generating one or more values for an additional variable that is different from the variables included in the set of variables.

19. The method of claim 14, further comprising:
calculating a measure of deviation between each generated set of values and the particular set of values associated with the monitored performance information, wherein the determined measures of similarity are based on the respective calculated measures of deviation between each generated set of values and the particular set of values associated with the monitored performance information.

20. The method of claim 14, wherein selecting the particular generated set of values further includes determining that the particular generated set of values are associated with an improvement of one or more measures of network performance.

* * * * *